(12) United States Patent
Paap et al.

(10) Patent No.: US 8,752,539 B2
(45) Date of Patent: Jun. 17, 2014

(54) FOLDING GRILL

(75) Inventors: Robert Paap, Seevetal (DE); Philip Paap, Hamburg (DE)

(73) Assignee: Esbit Compagnie GmbH, Hamburg (DE)

( * ) Notice: Subject to any disclaimer, the term of this patent is extended or adjusted under 35 U.S.C. 154(b) by 584 days.

(21) Appl. No.: 12/775,761

(22) Filed: May 7, 2010

(65) Prior Publication Data

US 2011/0146656 A1 Jun. 23, 2011

(30) Foreign Application Priority Data

Dec. 23, 2009 (DE) .................... 20 2009 017 435 U

(51) Int. Cl.
*A47J 37/07* (2006.01)

(52) U.S. Cl.
USPC ...... 126/25 R; 126/25 A; 126/9 R; 126/25 B; 126/38; 99/421 H; 99/450

(58) Field of Classification Search
USPC ............... 126/25 R, 9 R, 30, 25 B, 38, 25 A; 99/421 H, 450, 482, 385, 449
See application file for complete search history.

(56) References Cited

U.S. PATENT DOCUMENTS

| 4,457,290 | A |   | 7/1984  | Edwards |
|-----------|---|---|---------|-----------------------|
| 4,561,417 | A | * | 12/1985 | Chen .............. 126/25 A |
| 4,569,327 | A | * | 2/1986  | Velten ............. 126/25 A |
| 4,681,083 | A | * | 7/1987  | Shu ................. 126/9 R |
| 5,105,726 | A | * | 4/1992  | Lisker ............. 99/340 |
| 5,243,961 | A | * | 9/1993  | Harris ............. 126/9 R |
| 5,333,540 | A | * | 8/1994  | Mazzocchi ......... 99/421 H |
| 6,439,111 | B1 | * | 8/2002 | Lu ................. 99/449 |
| 6,557,546 | B1 | * | 5/2003 | Gibbons ........... 126/41 R |
| 6,708,604 | B1 | * | 3/2004 | Deichler, Jr. ..... 99/482 |
| 6,739,473 | B2 | * | 5/2004 | Kahler et al. ..... 220/759 |
| 2002/0148458 | A1 | * | 10/2002 | Andress ........... 126/25 R |

FOREIGN PATENT DOCUMENTS

| DE | 3105775 A1   | 9/1982 |
| DE | 102005031817 A1 | 1/2007 |

* cited by examiner

*Primary Examiner* — Avinash Savani
(74) *Attorney, Agent, or Firm* — Casimir Jones, S.C.

(57) ABSTRACT

The invention relates to a barbecue having a grill grate and a coal surface. The barbecue can be brought into a usage state and into a transport state.

7 Claims, 2 Drawing Sheets

FOLDING GRILL

This application claims the benefit of German Application No. 202009017435.2, filed Dec. 23, 2009.

The invention relates to a barbecue having a grill grate and a coal surface. The barbecue can be brought into a usage state and into a transport state.

When a barbecue event is to take place in a park or in natural surroundings, then the barbecue, the coal and all other barbecue utensils have to be transported there. The transportation is awkward.

The object of the invention is to present a barbecue which is more user-friendly in respect of transportation to the site of the barbecue event. Starting from the prior art stated in the introduction, the object is achieved by the features of the main claim. According to this, the barbecue has housing parts which in the usage state have a different position relative to the coal surface than in the transport state. In the usage state, the housing parts hold the grill grate above the coal surface. In the transport state, the housing parts form with the coal surface a transport bay. Advantageous embodiments can be found in the subclaims.

Firstly, some terms shall be explained. In the usage state, the barbecue is ready for use. The grill grate on which the barbecue items, such as steaks or sausages, are prepared, is disposed above the coal surface. Heat rising from the coal surface acts upon the barbecue items. The coal surface serves to receive the fuel. In most cases, wood charcoal is used as fuel. The use of other fuels is also possible. The term coal is used below as a collective term for all fuels. In the transport state, the barbecue has a different shape than in the usage state and is designed to be transported to the site of the barbecue event and back.

By a transport bay is meant an enclosed space in which objects can be transported. The walls of the transport bay can be formed by continuous surfaces. There can also be openings in the walls, which should be smaller, however, than the objects to be transported.

According to the invention, housing parts are provided, the setting of which relative to the coal surface is variable. In the usage state, the housing parts have a different setting relative to the coal surface than in the transport state. In the usage state, the housing parts hold the grill grate above the coal surface. In the transport state, the housing parts form with the coal surface a transport bay. The transport bay can serve, for instance, to receive the coal or to receive the barbecue items. The transport bay makes it easier to transport the necessary utensils to the site of the barbecue event.

In the transport state, the barbecue is intended to be as easily manageable as possible. In an advantageous embodiment, the housing parts are aligned in the transport state substantially parallel to the coal surface and in the usage state substantially perpendicular to the coal surface. In the usage state, the grill grate is held by the housing parts at sufficient distance to the coal surface. Preferably, the housing parts at the same time form in the usage state a foot for the barbecue, by which the coal surface is held at a distance from the standing surface. Termed as the standing surface is the surface on which the barbecue stands in the usage state. The barbecue preferably comprises two housing parts, which in the transport state form together with the coal surface the transport bay.

For the switching of the housing parts between the usage state and the transport state, the housing parts are connected to the coal surface by swivel joints. Where a direct connection of this kind is provided between the housing parts and the coal surface, the barbecue, unlike, for instance, in DE 31 05 775 A1, comprises just a few moving parts. For the switching between the transport state and the usage state, all that is necessary is to swivel the housing parts about the swivel joints. The swivel joints are preferably disposed on a rim belonging to the coal surface. The rim can extend around the coal surface, be rigidly connected to the coal surface and/or be aligned perpendicularly to the coal surface. The swivel joints are preferably distanced from the corners of the coal surface.

The finding and maintenance of the correct swivel position of the housing parts can be facilitated by latching elements between the housing parts and the coal surface. The latching elements lock in place when the housing parts are in the position provided for the transport state and the usage state. Preferably, such latching elements are provided for the usage state and for the transport state.

The heat from the coal surface radiates not only upward, but also downward. In order to prevent fires from breaking about beneath the barbecue, a heat shield can be provided, which in the usage state is disposed beneath the coal surface and which thus, at the same time, forms a standing surface for the barbecue. The heat shield is preferably designed such that in the usage state it has a distance to the ground on which the barbecue is standing. On the heat shield position markers can be provided, which define a specific position of the barbecue on the heat shield. For instance, recesses which fit the feet of the barbecue can be configured in the heat shield. In order to improve the stability, the heat shield can be connectable to the barbecue by means of a screw joint. To this end, a nut can be embedded in the feet of the barbecue, into which nut a screw can be screwed from below. For easy operation, the screw can be a thumb screw.

In the transport state, the heat shield, too, is intended to be stowed away in a space-saving manner. Preferably, the heat shield rests in the transport state flat on a surface of the barbecue. The surface of the barbecue can be formed, for instance, by the coal surface or the housing parts. The heat shield can then form a plane outer face of the barbecue without outwardly projecting elements.

In order to prevent a build-up of heat between the coal surface and the heat shield, it can be provided that in the usage state a passage remains between the housing parts and the coal surface, through which the hot air can be released upward. In order further to improve the release of heat, openings can be configured in the housing parts, through which hot air can escape.

The grill grate is designed such that the heat emanating from the coal surface can impact nicely upon the barbecue items. Normally, the grill grate has openings for a direct thermal impact. A grill grate in the form of a continuous surface is also possible. The grill grate is preferably designed such that in the transport state it fits into the transport bay. For handling in the hot state, the grill grate can have an outwardly projecting handle. For space-saving transportation, the handle is preferably removable. In the usage state, the grill grate is held by the housing parts, a plurality of different height positions preferably being possible.

When the barbecue is in use, the coal lies on the coal surface. The coal surface can have openings through which ash of the coal can fall out downward. In parks and public areas, it is desirable, however, that nothing is left behind after barbecue events. The ash can be most easily taken back home if it remains lying on the coal surface. For this reason, the coal surface is preferably a continuous surface. The coal surface can be bounded by a rim which prevents the coal from sliding down to the side from the coal surface. The rim can be formed by side walls which surround the coal surface to all sides. In the side walls, openings can be configured to ensure a sufficient supply of air to the coal on the coal surface.

In the transport state, the barbecue preferably has approximately the shape of a cuboid. The dimensions of the cuboid are substantially determined by the coal surface. The surface lying opposite the coal surface is formed by the housing parts, which there preferably butt flush one against the other. To the side, the housing parts can project in relation to the coal surface. The housing parts can be designed such that they extend with their largest surface over the full width of the coal surface and laterally embrace the coal surface.

In order further to facilitate the transport of the barbecue, a bag tailored to the shape of the barbecue can be provided. The barbecue is placed into this bag for transportation. A second bag tailored to the transport bay can additionally be provided. Into this second bag can be placed the coal or the other utensils which are intended to be transported in the transport bay.

The invention is described in greater detail below based on an advantageous embodiment with reference to the appended drawings, wherein.

Figure 1:
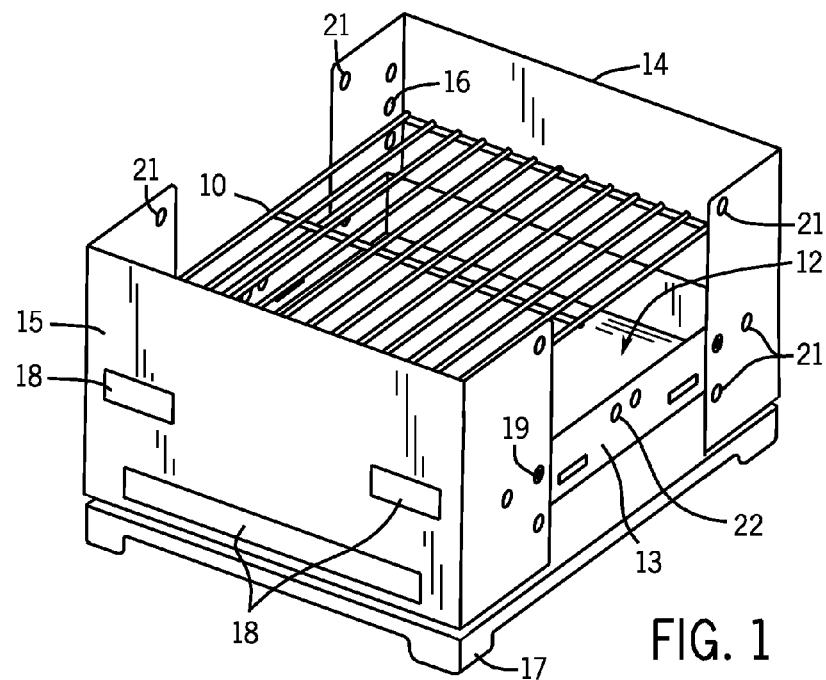
FIG. 1 shows an embodiment of a barbecue according to the invention in the usage state.
Figure 2:
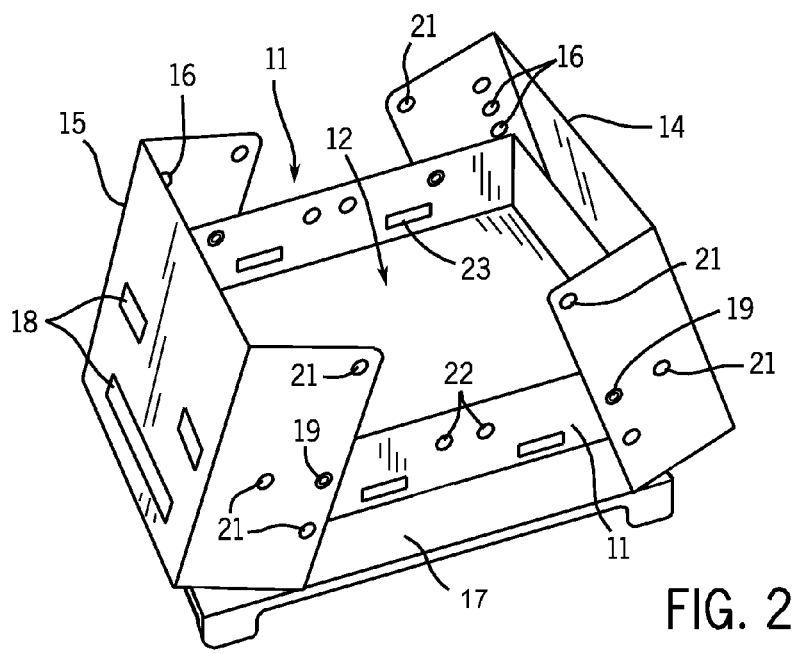
FIG. 2 shows the embodiment from FIG. 1 in an intermediate state between the usage state and the transport state.

A barbecue according to the invention which is shown in FIGS. 1 and 2 comprises a grill grate 10 and a coal tray 11. In the usage state which is shown in FIG. 1 and into which the barbecue is brought for the purpose of use, the grill grate 10 is arranged at a suitable distance above the coal tray 11. In the coal tray 11, coal can be brought to a glow for the preparation of barbecue items on the grill grate 10.

Figure 5:
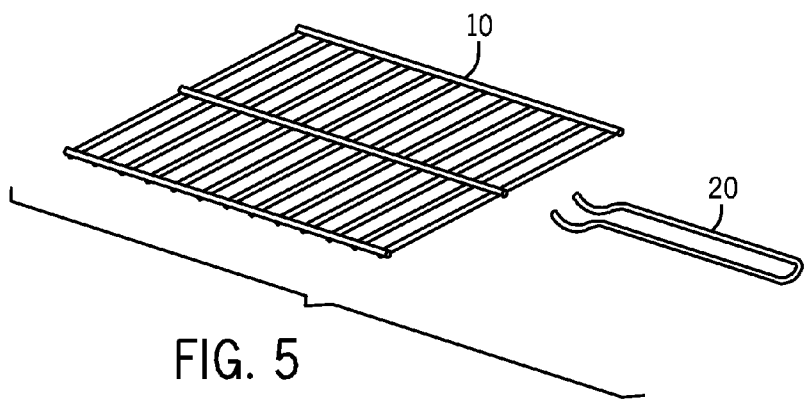
FIG. 5 shows a grill grate of the barbecue according to the invention.

The coal tray 11 consists of a coal surface 12 on which the coal lies, and a side wall 13 which surrounds the coal surface 12 to all sides. In the side wall 13 openings 23 are provided to ensure a good supply of air to the coal on the coal surface 12. The grill grate 10 has substantially the same dimensions as the coal surface 12. For the handling of the grill grate 10, a removable handle 20 is provided, as shown by FIG. 5.

The barbecue comprises two housing parts 14, 15, which in the usage state hold the coal tray 11 and the grill grate 10 in the correct position relative to each other. The housing parts 14, 15 lie opposite one another and extend over the entire width of the barbecue. On both sides, the housing parts 14, 15 are bent over, so that they laterally embrace the coal tray 11 and the grill grate 10. The coal tray 11 is held by the housing parts 14, 15 at a distance to the standing surface of the barbecue, and the grill grate 10, in turn, at a distance to the coal tray 11. The grill grate 10 rests on mountings 16 of the housing parts 14, 15. Several sets of mountings 16 are provided, so that the grill grate 10 is adjustable in height and can be arranged at different distances to the coal surface 12.

The barbecue can be placed directly with the housing parts 14, 15 onto the floor. However, heat is radiated downward from the coal surface 12 and there is a risk of combustible objects igniting under the barbecue. For this reason, a heat shield 17 is provided, onto which the barbecue can be placed. In the heat shield 17, recesses (not represented) are configured. Feet of the barbecue (likewise not represented) can engage in the recesses, so that the position of the barbecue on the heat shield 17 is clearly defined and the barbecue is prevented from slipping.

In order to prevent a build-up of heat between the coal tray 11 and the heat shield 17, the housing parts 14, 15 have over the width of the barbecue a distance to the coal tray 11. Hot air can escape upward between the coal tray 11 and the housing parts 14, 15. In order further to improve the heat exchange, openings 18 can additionally be provided in the housing parts 14, 15.

The housing parts 14, 15 are connected to the side walls 13 of the coal tray 11 by swivel joints 19. FIG. 2 shows the housing parts 14, 15 in partially swiveled-in state. Via the swivel joints 19, the housing parts 14 can be swiveled out of the vertical setting shown in FIG. 1 into the horizontal setting shown in FIG. 3 in which the housing parts 14, 15 lie parallel to the coal surface 12. The edges which in FIG. 1 form the upper closure of the barbecue terminate flush with one another, so that the housing parts 14, 15 form a substantially continuous surface lying parallel to the coal surface 12. The bottom sides of the housing parts 14, 15, on which the barbecue stands in FIG. 1, become side faces once the housing parts 14, 15 have been swiveled in. Preferably, these side faces are substantially continuous surfaces. As shown by FIG. 4, the heat shield 17 can be placed on top of the swiveled-in housing parts 14, 15. The heat shield 17 thus forms a substantially plane terminating surface of the barbecue. Both with and without mounted heat shield, the barbecue has altogether approximately the shape of a cuboid.

In the side parts of the housing parts 14, 15 and in the side walls 13 of the coal tray 11, projections 21 and associated recesses 22 are configured. When the housing parts 14, 15 are fully swiveled-in (FIG. 3) or fully swiveled-out (FIG. 1), the projections 21 engage in the relevant recesses 22 and thereby form latching elements which define the correct swivel positions of the housing parts 14, 15. The resistance of the latching elements is surmounted by the use of a slightly increased force.

Figure 3:
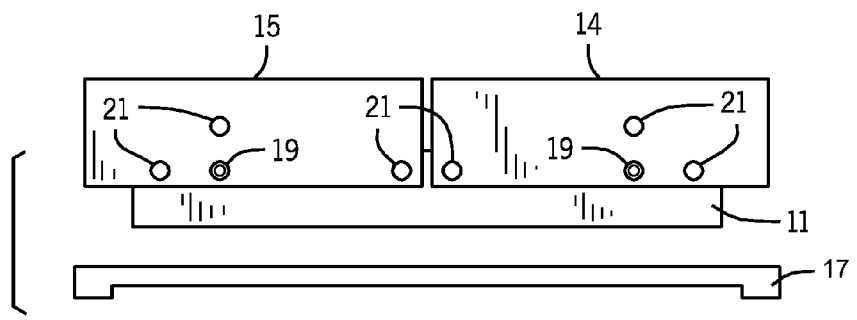
FIGS. 3 and 4 show side views of the barbecue according to the invention in the transport state.
Figure 4:
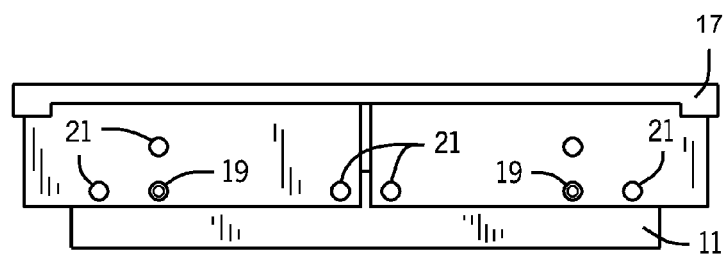

The state adopted by the barbecue in FIGS. 3 and 4 with swiveled-in housing parts 14, 15 is referred to as the transport state. In the transport state, the barbecue can easily be packed into a bag and transported to the site of the barbecue event. In addition, the interior of the barbecue, which in the transport state is enclosed by the coal tray 11 and the housing parts 14, 15, can be used as a transport bay. Into the transport bay can be inserted the grill grate 10 and the removable handle 20 belonging to the grill grate 10. The remaining space can be utilized, for instance, for transporting the coal, the barbecue items or other barbecue utensils. At the site of the barbecue event, the barbecue can be brought into the usage state, as shown in FIG. 1, with just a few maneuvers.

The invention claimed is:

1. A barbecue having a grill grate (10) and a coal surface (12), which barbecue can be brought into a usage state and a transport state, wherein the barbecue comprises no more than two u-shaped housing parts (14, 15) with heat exchange openings (18) located thereon, a coal surface (12) and a grill grate (10), wherein said housing parts (14, 15) are connected to said coal surface (12) by swivel joints (19) which allow the housing parts to rotate downwardly toward the coal surface, and in the usage state the housing parts have a different position relative to the coal surface (12) than in the transport state, wherein in the usage state, said housing parts (14, 15) hold the grill grate (10) above the coal surface (12), and extend below the coal surface (12) to contact a standing surface and to hold the coal surface (12) at a distance from the standing surface, and wherein in the transport state said housing parts (14, 15) form with the coal surface (12) a transport bay, wherein a heat shield (17) is provided having legs extending therefrom to hold the grill on the standing surface, which in the usage state shields the coal surface (12) against the ground, wherein the heat shield (17) in the transport state rests flat on a surface of the barbecue, wherein the heat shield (17) in the transport state forms a plane outer face of the barbecue.

2. The barbecue as claimed in claim 1, wherein in the usage state the housing parts (14, 15) are aligned substantially perpendicular to the coal surface (12) and in the transport state the housing parts (14, 15) are aligned substantially parallel to the coal surface (15).

3. The barbecue as claimed in claim 1, wherein swivel joints (19) are provided between the coal surface (12) and the housing parts (14, 15), and in that the housing parts (14, 15), in the switching between the usage state and the transport state, are swiveled about the swivel joints (19).

4. The barbecue as claimed in claim 1, wherein latching elements (21, 22) are provided between the housing parts (14, 15) and the coal surface (12), which lock in place when the housing parts (14, 15) are in the correct position for the usage state and the transport state.

5. The barbecue as claimed in claim 1, wherein the grill grate (10) is dimensioned such that in the transport state it fits into the transport bay.

6. The barbecue as claimed in claim 1, wherein a removable handle (20) is provided for the grill grate (10).

7. The barbecue as claimed in claim 1, wherein in the transport state it has approximately the shape of a cuboid.

* * * * *